J. D. WOLF.
SEPARATION OF METALS FROM THEIR ORES.
APPLICATION FILED JULY 7, 1905.

899,149.

Patented Sept. 22, 1908.
4 SHEETS—SHEET 1.

J. D. WOLF.
SEPARATION OF METALS FROM THEIR ORES.
APPLICATION FILED JULY 7, 1905.

899,149.

Patented Sept. 22, 1908.
4 SHEETS—SHEET 2.

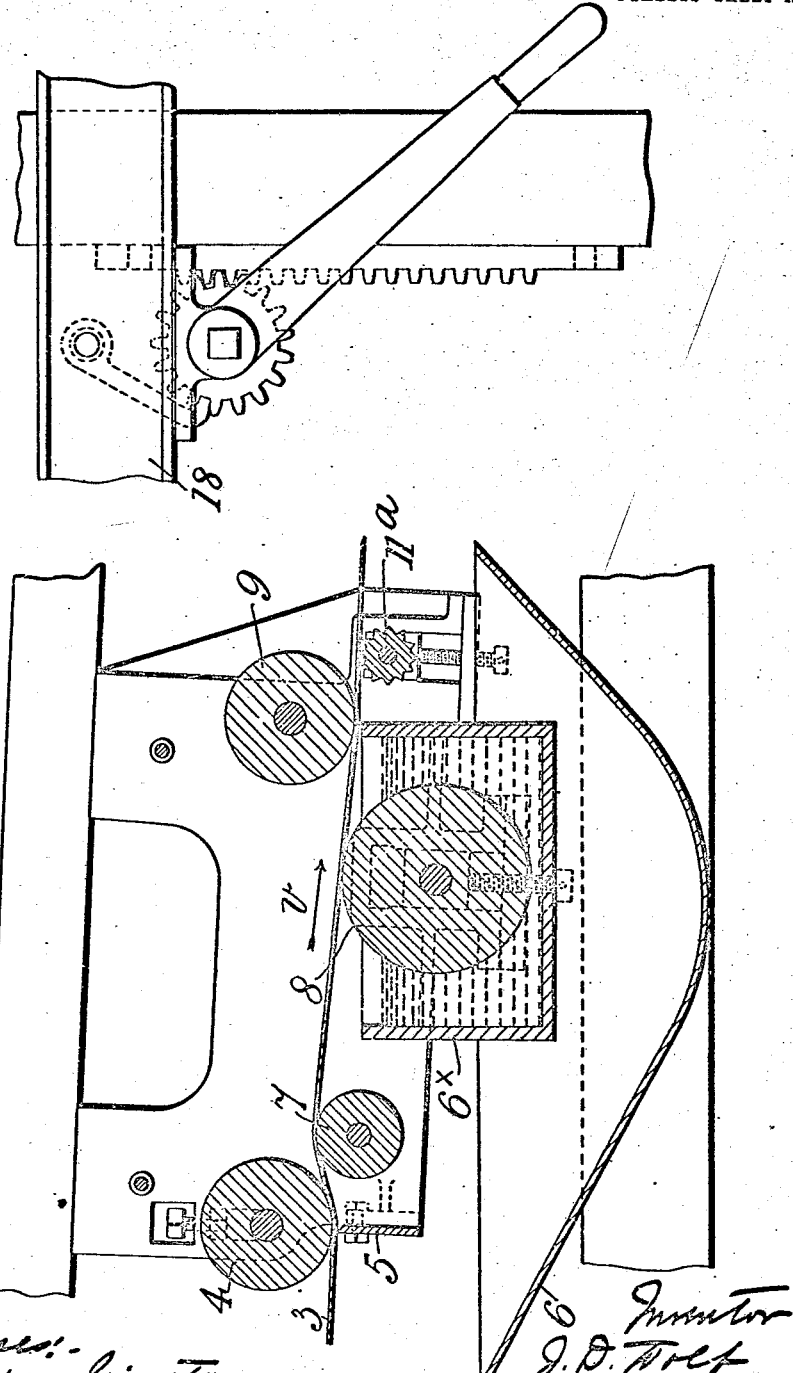

UNITED STATES PATENT OFFICE.

JACOB D. WOLF, OF LONDON, ENGLAND.

SEPARATION OF METALS FROM THEIR ORES.

No. 899,149.　　　　Specification of Letters Patent.　　Patented Sept. 22, 1908.

Application filed July 7, 1905. Serial No. 268,611.

*To all whom it may concern:*

Be it known that I, JACOB DAVID WOLF, a citizen of the United States of America, residing at 17 Throgmorton avenue, in the city of London, England, have invented certain new and useful Improvements in the Separation of Metals from Their Ores, of which the following is a specification.

This invention has for its object improvements relating to the separation of metals from their ores by the employment of oil or grease having a high degree of viscosity and cohesion. I employ oil or grease, which has been treated with chlorid of sulfur or other suitable material, to alter its physical characteristics or otherwise render it suitable for use in conjunction with an apparatus for separating metals from their ores.

By the terms oil or grease, I include any oil or grease or any oleaginous substance or compound that can be employed in carrying out my present invention and having a high degree of viscosity and cohesion. I may employ mineral oils such as heavy tar oils or residual oils, all of which substances I will, for the sake of brevity, hereinafter refer to as "oil".

I employ an endless belt to which traveling motion is imparted by any suitable means which is coated with said oils. This endless belt passes over two main rollers located at opposite ends of a suitable frame, one of such rollers being rather higher than the other so that the part of the belt lying between said rollers has a downward slope in the opposite direction to the travel of the belt. Onto this belt towards the higher main rollers, the ore in a more or less finely divided state together with water is fed advantageously in a stream, so that the "wet pulp" flows down towards the lower main roller and ultimately falls off the traveling belt at this point and carries with it the gangue as tailings while the metallic minerals from said wet pulp have been retained by the aforesaid oil on the belt and are recovered, all as will be more fully hereinafter disclosed.

Figure 1:
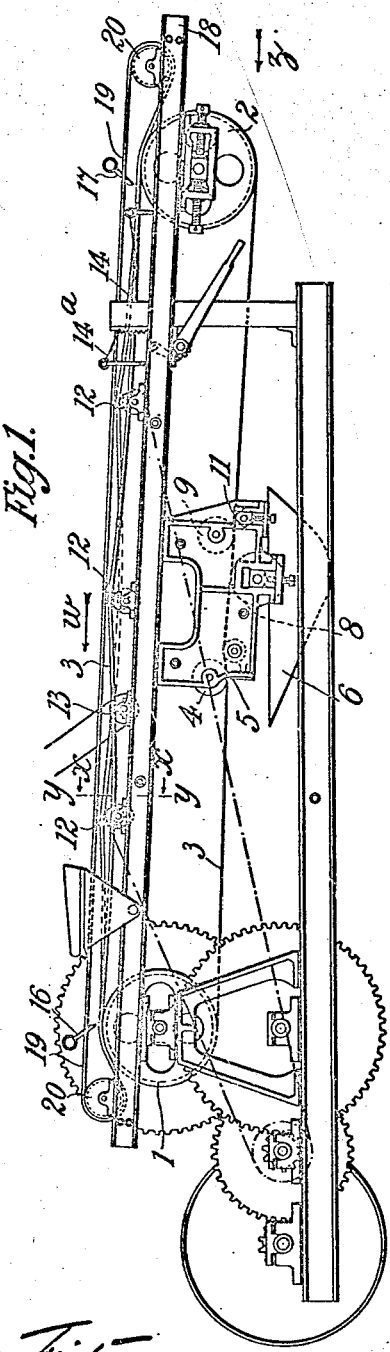
Figure 2:
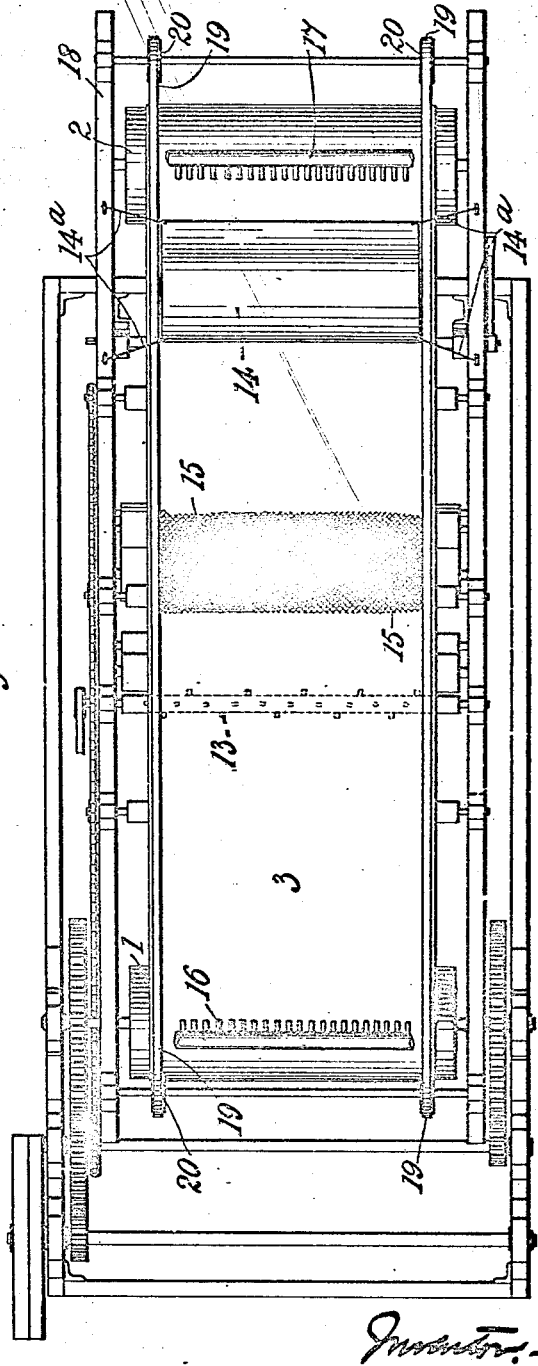
Figure 3:
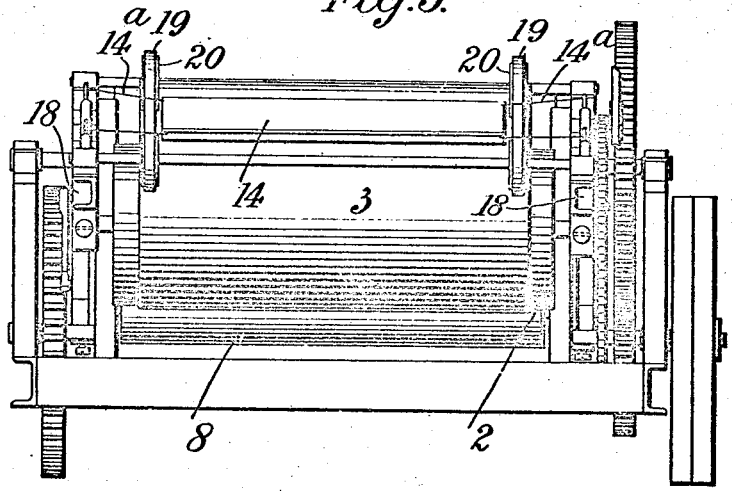
Figure 4:
Figure 5:
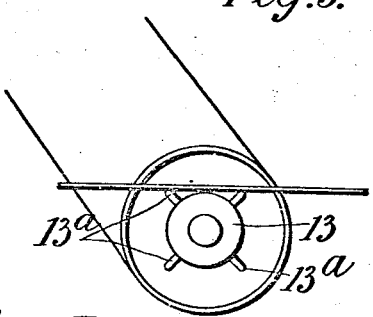
Figure 6:
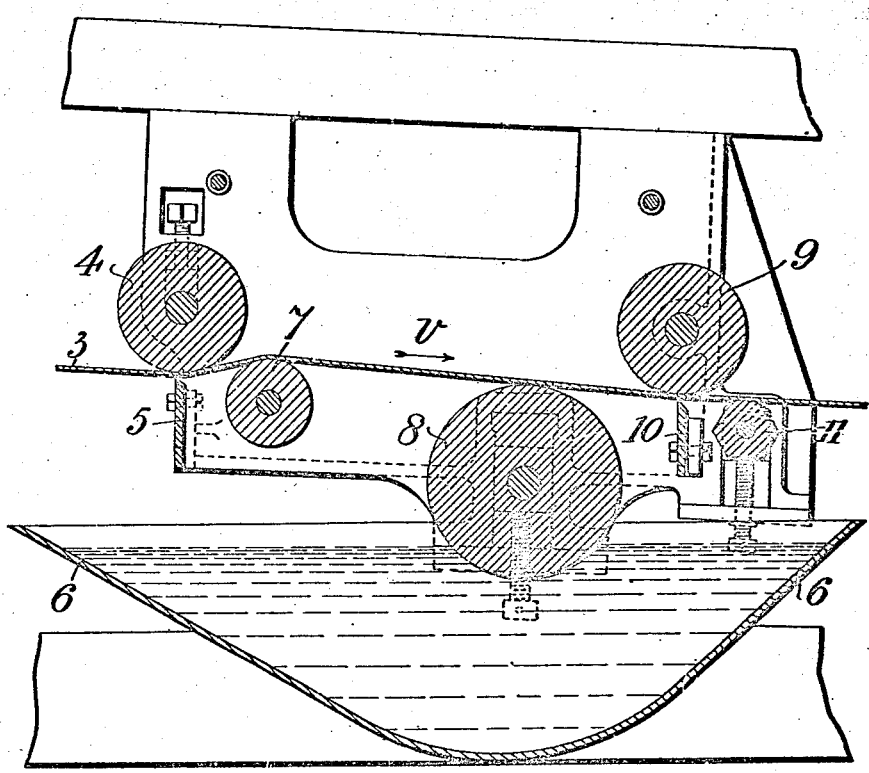

Referring to the accompanying drawings forming a part of this specification, in which like numerals refer to like parts in all the views:—Figure 1 is side view in elevation of a complete apparatus according to my present invention. Fig. 2 is a plan of Fig. 1. Fig. 3 is an end view looking in the direction of the arrow $z$ Fig. 1. Fig. 4 is a local view on the lines $y$—$y$ looking in the direction of the arrow $x$ Fig. 1 of one form of roller i. e. a cam roller or eccentric roller for raising and lowering the belt at different points transversely as said belt passes over said roller. Fig. 5 is a local view on an enlarged scale of another form of roller for imparting shaking or vertical movement to the endless traveling belt as it passes over said roller. Fig. 6 is a local vertical sectional view on an enlarged scale of the belt scraping and belt re-oiling device and bath holding the supply of said oil. Fig. 7 is a similar view to Fig. 6 only showing modified arrangement and construction of the bath or holder for the oil (or other tacky substance to be applied to the belt) namely a separate holder for the oil before it has been applied to the traveling belt and a separate holder for the oil after same has been removed from the belt with any metallic mineral therein. Fig. 8 is a local view on an enlarged scale showing suitable means for elevating or lowering one end of the table or frame carrying the endless traveling belt.

1 is main roller at the higher end of the table and 2 is main roller at the lower end of the table (illustrated in Fig. 1) hereinafter referred to as the main rollers 1 and 2.

3 is the endless belt (advantageously made of canvas) traveling in the direction of the arrow $w$ Fig. 1, which belt passes around the main roller 1 thence along under the roller 4 which keeps said belt 3 pressed down against the scraper blade 5 (see Figs. 1 and 7) by which latter the oil on the surface of said belt 3 (or any desired portion thereof) is scraped off and drops into the oil reservoir or tank 6 which in the case illustrated in Figs. 1 and 6 is the oil bath from which the belt is re-oiled or in the arrangement shown in Fig. 7 this tank or oil receptacle 6 is a separate receptacle which receives therein such scraped off oil—as hereinafter explained, while the fresh oil supply for spreading on the belt is taken from another and separate receptacle $6^\times$ having no connection with the receptacle 6 so that by this arrangement in Fig. 7 the belt is oiled from the bath of fresh oil only in the chamber $6^\times$ while the mineralized oil scraped off the belt by the scraper 5 is passed into another and separate receptacle entirely.

Either the scraper 5 or roller 4 above same may be made adjustable vertically or otherwise so as to put more or less pressure from the scraper 5 upon the belt 3 or from the belt 3 upon the scraper. After passing the scraper 5 the belt passes on (advantageously over a roller 7) in the direction of the arrow v and the outside of said belt 3 (which is now the underside) then makes contact with the oiling roller 8 which is partly immersed in the oil in the oil bath 6 or 6<sup>x</sup>; said oiling roller 8 advantageously being vertically adjustable in its bearings as for example by means of adjustable bearings as indicated in dotted lines in Figs. 6 and 7. The belt 3 after passing the oiling roller 8 and having been thoroughly oiled then passes under the roller 9 (or the latter may be dispensed with) and over the doctor or scraper 10 which latter is advantageously adjustable so that any desired amount of the oil spread on the belt by the roller 8 can be scraped off by the doctor or scraper 10 i. e. so that exactly the desired thickness or quantity of oil required on the belt can be left thereon. After passing the scraper 10 the belt next passes over the polygonal roller 11 (Fig. 6) which may advantageously be an octagonal or hexagonal roller as illustrated; said polygonal roller 11 being adjustable so as to be forced with the desired amount of pressure against the oiled surface of the belt 3 as it passes said roller which latter is thereby rotated or may be independently (i. e. mechanically) rotated so that as each flat side of said roller 11 moves away from the belt 3 to which it tends to stick thereby the oil surface is abraded or rendered ragged or uneven by the drawing apart of the oil surface and roller surface thus forming a roughened or uneven oil surface very suitable for my purpose namely so as to present as much oil surface to the materials (metallic minerals etc.) which later on are passed over same. Or in place of the polygonal sided roller 11 I may employ a fluted roll (either with or without the doctor or scraper 10) such for instance as the fluted roller 11<sup>a</sup> shown in Fig. 7 whereby any surplus oil can be squeezed off the belt and the surface of the oil layer fluted and corrugated or otherwise roughened for the aforesaid purposes. Or if desired I may use other similar devices for the aforesaid purposes. The belt having been thus oiled then passes on round the lower main roller 2 and over any desired number of wabbling rolls 12 (see Fig. 4) three such rolls being shown in Fig. 1 or the belt 3 passes over one or more tapping rolls 15 (see Fig. 5), which are provided with a number of radial arms 13<sup>a</sup> which impart a rapid vertical vibratory action or tapping on the underside of the belt which serves to assist in bringing the mineral particles in contact with the oil on the belt.

Over the top of the belt I arrange one or more aprons 14 which may be of matting or canvas etc. which is secured over the belt for example by the strings 14<sup>a</sup> as shown in the drawings in suchwise that the underside of each apron or matting 14 will lie in the path of travel of the wet pulp flowing along the belt 3 with the result that the mineral particles of the wet pulp will thereby be thoroughly brought into contact with the oil on the belt. Or in place of or in addition to the aforesaid apron 14 of flexible material I may use any other suitable material such for example as a wire gauze or grid 15 as indicated in Fig. 2. In addition to the water spray or water supply employed at the upper end of the belt I also find it advantageous to employ another water spray 17 at the lower end of the belt in or about the position shown in Fig. 2 with the water directed against the flow of the wet pulp along the belt 3.

Fig. 8 is an enlarged view of the rack and pinion arrangement by which that end of the frame 18 which carries the lower main roller 2 can be raised and lowered by means of a rack and pinion motion as indicated in this figure and Figs. 1 and 2.

The various moving parts of the machine are driven by any suitable means such as by belt and spur gearing as indicated in the drawings as will be readily understood and which driving mechanism need not therefore be here further described.

An edging is provided along each side edge of the belt so as to prevent the wet pulp from flowing off the belt laterally such edging either being provided on the belt itself or this edging may be formed and arranged to act as indicated in the drawings namely by means of two separate edging belts 19 passing round pulleys 20 at each end of the machine so that as the belt 3 passes along the upper part of the table these edging belts form raised edges 19 to said belt 3 (see Fig. 4) and thereby prevent the wet pulp flowing off the same laterally.

What I claim is:—

1. The combination with a traveling belt, of means for coating one face of same with a metal selective substance, means for roughening said coating, said roughened coating adapted to receive wet ore pulp, and means for relieving said belt of said selective substance and adhering metals, substantially as described.

2. The combination with a traveling belt, of means for coating one face with a metal selective substance, means for roughening said coating, comprising a revoluble device adapted to engage said coating, said roughened coating adapted to receive wet ore pulp, and means for relieving said belt of said selective substance and adhering metals, substantially as described.

3. The combination with a traveling belt, of means for coating one face of same with a metal selective substance, means for roughening said coating, comprising an engaging revoluble member adjustably supported and extending transversely of said belt, said roughened coating adapted to receive wet ore pulp, and means for relieving said belt of said selective substance and adhering metals, substantially as described.

4. The combination with a frame provided at each end with a main roller, of an endless belt mounted on said main roller, a wabbling roller extending transversely between the upper and lower portions of said belt and adapted to engage the upper portion for imparting a wabbling motion thereto, idler rollers engaging the lower portion of said belt, a coating roller disposed adjacent said idler rollers and adjustably journaled to engage the lower face of said belt, said coating roller being adapted to receive and transfer to said belt a coating of a metal selective substance, and a scraper on one side of said coating roller adapted to scrape off said substance after the belt has made a cycle in its operation, substantially as described.

5. In apparatus for the separation of metals from their ores of the character wherein the latter in the form of a wet pulp is caused to flow over an oiled endless traveling belt the arrangement and combination with such belt of adjustable means to scrape off the oil from said belt after the wet pulp has been subjected thereto, means adjacent to the point where the oil is applied to the belt to vary the thickness and character of surface to the layer of oil spread on the belt, devices for tapping the belt so as to move same vertically at one or more points where the wet pulp is flowing over said belt, wabbling rolls to raise and lower the belt alternately from side to side at the points where the wet pulp is flowing over same, and a water supply at one or more points on said belt where the latter supports the wet pulp, substantially as and for the purposes hereinbefore described.

6. In apparatus for the separation of metals from their ores of the character wherein the latter in the form of a wet pulp is caused to flow over an oiled endless traveling belt the arrangement and combination with such belt of adjustable means to scrape off the oil from said belt after the wet pulp has been subjected thereto, means adjacent to the point where the oil is applied to the belt to vary the thickness and character of surface to the layer of oil spread on the belt, and a device or devices arranged over said belt and in the path of travel of said wet pulp as it flows along said belt devices for tapping the belt so as to move same vertically at one or more points where the wet pulp is flowing over said belt, and wabbling rolls to raise and lower the belt alternately from side to side at the points where the wet pulp is flowing over same, substantially as and for the purposes hereinbefore described.

7. In apparatus for the separation of metals from their ores of the character wherein the latter in the form of a wet pulp is caused to flow over an oiled endless traveling belt, the arrangement and combination with such belt of adjustable means to scrape off the oil from said belt after the wet pulp has been subjected thereto, means adjacent to the point where the oil is applied to the belt to vary the thickness and character of surface to the layer of oil spread on the belt, devices for tapping the belt so as to move same vertically at one or more points where the wet pulp is flowing over said belt, wabbling rolls to raise and lower the belt alternately from side to side at the points where the wet pulp is flowing over same, a device or devices arranged over said belt and in the path of travel of said wet pulp as it flows along said belt, and a water supply at one or more points on said belt where the latter supports the wet pulp, substantially as and for the purposes hereinbefore described.

J. D. WOLF.

Witnesses:
 E. GAUDER,
 H. D. JAMESON.